United States Patent
Urano et al.

(10) Patent No.: US 7,969,273 B2
(45) Date of Patent: Jun. 28, 2011

(54) INSULATING MEMBER

(75) Inventors: Hiroaki Urano, Aichi-ken (JP); Atomi Arakawa, Anjo (JP); Yutaka Komatsu, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/663,815

(22) PCT Filed: Jun. 10, 2008

(86) PCT No.: PCT/JP2008/060939
§ 371 (c)(1),
(2), (4) Date: Jan. 28, 2010

(87) PCT Pub. No.: WO2008/153175
PCT Pub. Date: Dec. 18, 2008

(65) Prior Publication Data
US 2010/0188181 A1 Jul. 29, 2010

(30) Foreign Application Priority Data

Jun. 13, 2007 (JP) .................................. 2007-156679

(51) Int. Cl.
*H01F 27/30* (2006.01)

(52) U.S. Cl. ...................................................... 336/198

(58) Field of Classification Search ................... 336/65, 336/200, 198, 205–208, 220–223; 310/45, 310/208, 260
See application file for complete search history.

(56) References Cited

U.S. PATENT DOCUMENTS

| 4,710,664 A | * | 12/1987 | Cox et al. | ............... 310/216.119 |
| 2009/0302694 A1 | * | 12/2009 | Asai | ............................ 310/45 |
| 2010/0194214 A1 | * | 8/2010 | Takahashi et al. | ............. 310/43 |

FOREIGN PATENT DOCUMENTS

| JP | 59117437 A | * | 7/1984 |
| JP | 2002-223542 A | | 8/2002 |
| JP | 2005-057931 A | | 3/2005 |
| JP | 2005-130645 A | | 5/2005 |
| JP | 2005-354804 A | | 12/2005 |
| JP | 2007-014097 A | | 1/2007 |

* cited by examiner

*Primary Examiner* — Tuyen Nguyen
(74) *Attorney, Agent, or Firm* — Sughrue Mion, PLLC

(57) ABSTRACT

An insulating member is provided with a rear surface section, a pair of side surface sections and a pair of column sections. The rear surface section is formed to be arranged between an edgewise coil and the yoke inner circumference surface of a stator core. The pair of side surface sections extend from the rear surface section to cover the side surfaces on the slot side of teeth and are formed flexibly in the facing directions. The pair of column sections extend from the rear surface section along the end surfaces on the coil end side of the teeth, while keeping spaces between the column sections and the side surface sections so as not to disturb deformation of the side surface sections.

5 Claims, 4 Drawing Sheets

INSULATING MEMBER

CROSS REFERENCE TO RELATED APPLICATIONS

This application is a National Stage of International Application No. PCT/JP2008/060939 filed Jun. 10, 2008, which claims priority from Japanese Patent Application No. 2007-156679, filed Jun. 13, 2007, the contents of all of which are incorporated herein by reference in their entirety.

TECHNICAL FIELD

The present invention relates to an insulating member, and more particularly to an insulating member for insulating a core from an edgewise coil wound around teeth formed on an inner circumferential surface of the core.

BACKGROUND ART

Japanese Patent Laying-Open No. 2005-57931 discloses a stator using an edgewise coil. In this stator, an insulating bobbin having an edgewise coil wound around includes a teeth insulating part insulating a tooth from the edgewise coil and first and second extending parts each extending from each end portion of the teeth insulating part approximately parallel to a yoke inner surface.

In the stator disclosed in the above publication, the first and second extending parts are each provided at each end portion of the teeth insulating part. Therefore, in order to form an edgewise coil, it is necessary to wind a flat wire around the insulating bobbin. The edgewise coil, however, requires bending in the width direction of the flat wire, and it is therefore not always easy to form the edgewise coil by winding a flat wire around the insulating bobbin. Moreover, in the aforementioned stator, the rigidity of the insulating bobbin has to be increased because a great force is exerted on the insulating bobbin during coil winding. As a result, the insulating bobbin is unfortunately increased in size.

DISCLOSURE OF THE INVENTION

The present invention is therefore made to solve the aforementioned problems. An object of the present invention is to provide an insulating member more suitable for an edgewise coil.

According to the present invention, an insulating member for insulating an edgewise coil wound around a tooth of a core from the core includes a rear surface part, first and second side surface parts, and first and second column parts. The rear surface part is formed to be arranged between the edgewise coil and a yoke inner circumferential surface of the core. The first and second side surface parts extend from the rear surface part to cover first and second side surfaces, respectively, of the tooth opposing slots adjacent to the tooth and are formed to be flexible in a direction opposing each other. The first and second column parts extend from the rear surface part along third and fourth side surfaces of the tooth different from the first and second side surfaces of the tooth, while having a gap from the first and second side surface parts so as to permit deformation of the first and second side surface parts, and are formed to be arranged between an inner circumferential surface of the edgewise coil and the third and fourth side surfaces, respectively.

In the present invention, the first and second side surface parts are formed to be flexible in the direction opposing each other, and the first and second column parts are formed so as to permit deformation of the first and second side surface parts and to be arranged between the inner circumferential surface of the edgewise coil and the tooth. Accordingly, after the edgewise coil is formed, the edgewise coil can be attached to the insulating member by flexing the first and second side surface parts in the direction opposing each other. Thus, in accordance with the present invention, the assembly of the edgewise coil is significantly improved.

Preferably, each of the first and second column parts at least has a thickness corresponding to a distance that can insulate the edgewise coil from the tooth.

In the present invention, since a gap is provided between each of the first and second column parts and the first and second side surface parts, the third and fourth side surfaces of the tooth are not entirely covered with the insulating member. Then, each of the first and second column parts is formed to have at least a thickness corresponding to a distance that can insulate the edgewise coil from the tooth. Thus, in accordance with the present invention, insulation between the edgewise coil and the tooth can certainly be secured.

Preferably, each of the first and second side surface parts has a flange part formed at a tip portion thereof to support the edgewise coil in a stacking direction.

Accordingly, in accordance with the present invention, loosening of the edgewise coil can certainly be prevented.

Further preferably, a flange width of the flange part is smaller than a width of a flat plate conductor that forms the edgewise coil.

In the present invention, since the edgewise coil is formed of a flat plate conductor, the edgewise coil can be supported in the stacking direction even though the flange width of the flange portion is smaller than the width of the flat plate conductor. Accordingly, in accordance with the present invention, the material costs of the insulating member can be reduced.

Preferably, the core is a stator core. The insulating member insulates the edgewise coil wound around the tooth of the stator core from the stator core.

As described above, in accordance with the present invention, the assembly of the edgewise coil is significantly improved. The insulating member more suitable for an edgewise coil is thus provided.

BEST MODES FOR CARRYING OUT THE INVENTION

Figure 1:
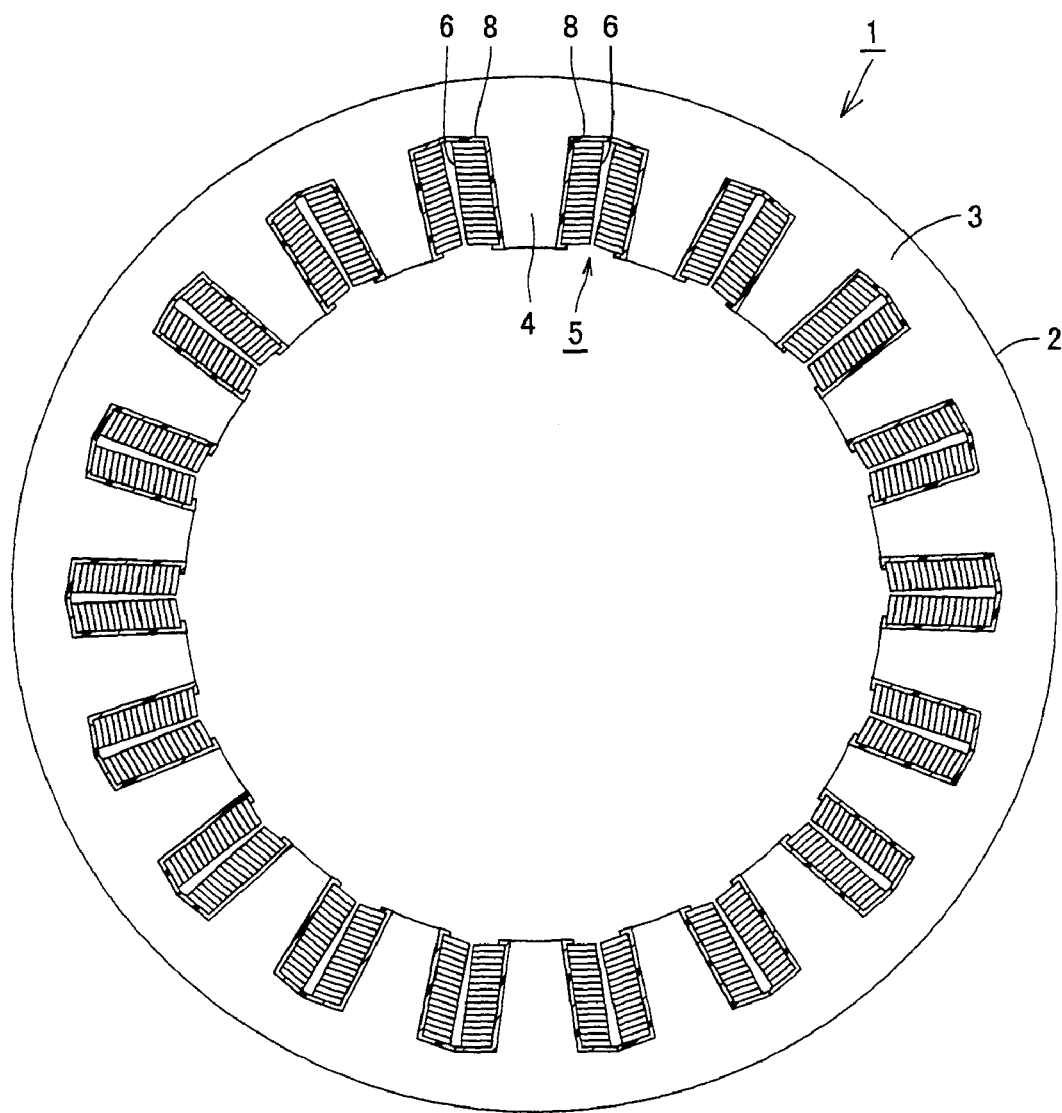
FIG. 1 is a cross-sectional view of a stator employing an insulating member in accordance with an embodiment of the present invention.

In the following, an embodiment of the present invention will be described in detail with reference to the drawings. It is noted that the same or corresponding parts in the figures are denoted with the same reference characters and the detailed description thereof will not be repeated.

FIG. 1 is a cross-sectional view of a stator employing an insulating member in accordance with an embodiment of the present invention. Referring to FIG. 1, a stator 1 includes a stator core 2, a plurality of edgewise coils 6, and a plurality of insulating members 8.

Stator core 2 includes an annular yoke 3 and a plurality of teeth 4 formed at regular intervals along the circumferential direction on an inner circumferential surface of yoke 3. A slot 5 is formed between each tooth 4, which is occupied by edgewise coil 6 wound around tooth 4. Current fed to edgewise coils 6 wound around teeth 4 is controlled to generate a rotating magnetic field in stator 1.

A plurality of edgewise coils 6 are provided corresponding to a plurality of teeth 4. Each edgewise coil 6 is formed of a flat plate conductor wound by bending in the width direction and is intensively wound around the corresponding tooth 4 with insulating member 8 interposed. The surface of the flat plate conductor forming edgewise coil 6 is enameled in order to ensure insulation between the adjacent conductors. Then, a plurality of edgewise coils 6 are repeatedly disposed in the order of U-phase, V-phase, and W-phase in the circumferential direction of stator 1. The coils of the same phase are electrically connected with each other by a not-shown power distribution member. Edgewise coil 6 can increase the space factor as compared with a coil formed by winding a round wire and, in addition, is excellent in heat dissipation.

A plurality of insulating members 8 are provided corresponding to a plurality of edgewise coils 6. Each insulating member 8 insulates the corresponding edgewise coil 6 from stator core 2. Insulating member 8 is formed of a resin that provides excellent electrical isolation and can be flexed relatively easily and is made, for example, of PPS (polyphenylene sulfide) resin, LCP (liquid crystal polymer) resin, or the like.

Figure 2:
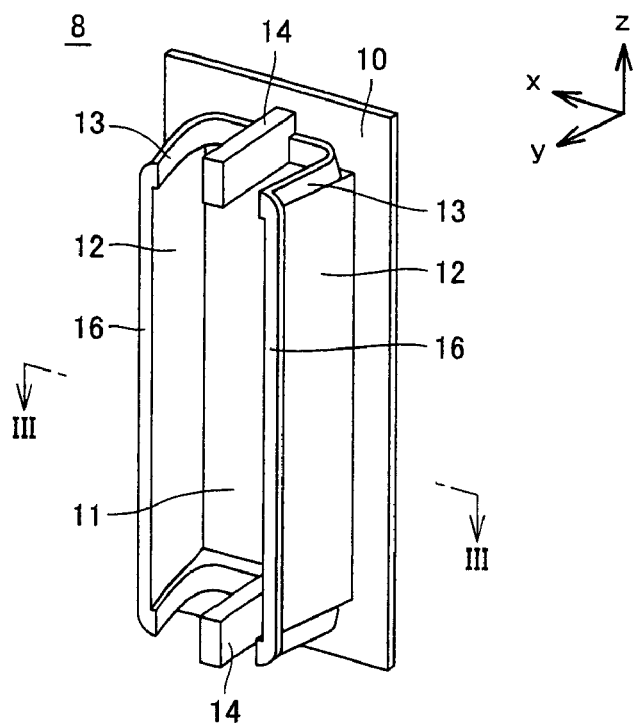
FIG. 2 is a perspective view of each insulating member shown in FIG. 1.

FIG. 2 is a perspective view of each insulating member 8 shown in FIG. 1. Referring to FIG. 2, insulating member 8 includes a rear surface part 10, a pair of side surface parts 12, and a pair of column parts 14. Rear surface part 10 has an opening part 11, through which the corresponding tooth 4 (FIG. 1) is passed through so that insulating member 8 is mounted on tooth 4. When insulating member 8 is mounted on tooth 4, rear surface part 10 is disposed between the corresponding edgewise coil 6 (FIG. 1) and the yoke inner circumferential surface at the back of the slot thereby to insulate edgewise coil 6 from yoke 3 (FIG. 1).

Side surface part 12 extends from an end portion of opening part 11 of back surface part 10 toward the inner circumferential direction of the stator core (y-direction) so that it can cover the side surface on the slot side of tooth 4. In other words, side surface part 12 insulates edgewise coil 6 in the slot from tooth 4 when insulating member 8 and the corresponding edgewise coil 6 are mounted on tooth 4. Then, a pair of side surface parts 12 can be flexed in the direction opposing to each other, as described later.

Furthermore, a flange part 16 is formed at a tip portion (y-direction) of side surface part 12. Flange part 16 is formed so that it can support edgewise coil 6 mounted on insulating member 8 in the stacking direction (y-direction), as described later. In other words, flange part 16 prevents edgewise coil 6 mounted on insulating member 8 from loosening in the inner circumferential direction of the stator core.

In addition, a side wall 13 is formed at each end portion in the z-direction of side surface part 12. This side wall 13 is formed to secure insulation between edgewise coil 6 and tooth 4 at each end portion in the z-direction of side surface part 12.

Column part 14 extends toward the inner circumferential direction (y-direction) of the stator core from the end portion of opening part 11 of rear surface part 10, approximately at the midpoint between a pair of side surface parts 12 and along the end surface on the coil end side of tooth 4. In other words, a pair of side surface parts 12 can flex in the direction opposing each other as described above, and then column part 14 extends from rear surface part 10 in the shape of a column along the end surface on the coil end side of tooth 4, while having a gap from side surface part 12 so as to permit deformation of side surface part 12.

When insulating member 8 and the corresponding edgewise coil 6 are mounted on tooth 4, column part 14 supports edgewise coil 6 in the z-direction and also keeps the insulation distance between edgewise coil 6 and tooth 4. In other words, since a gap is provided between column part 14 and side surface part 12, the end surface on the coil end side of tooth 4 is not entirely covered with insulating member 8. Then, column part 14 is formed to have at least a thickness (z-direction) corresponding to the distance that can insulate edgewise coil 6 from tooth 4.

Figure 3:
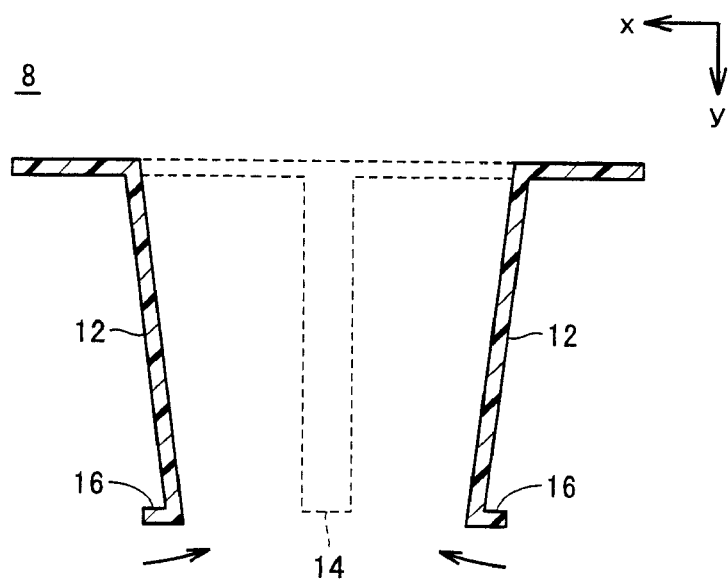
FIG. 3 is a cross-sectional view of section shown in FIG. 2.

FIG. 3 is a cross-sectional view of section III-III shown in FIG. 2. Referring to FIG. 3, insulating member 8 is made of a resin that can flex relatively easily as described above, and a pair of side surface parts 12 can flex in the direction opposing each other without column part 14 inhibiting its deformation. Then, the formed edgewise coil 6 can be mounted on insulating member 8 from the y-direction by flexing side surface parts 12 in the direction opposing each other.

Figure 4:
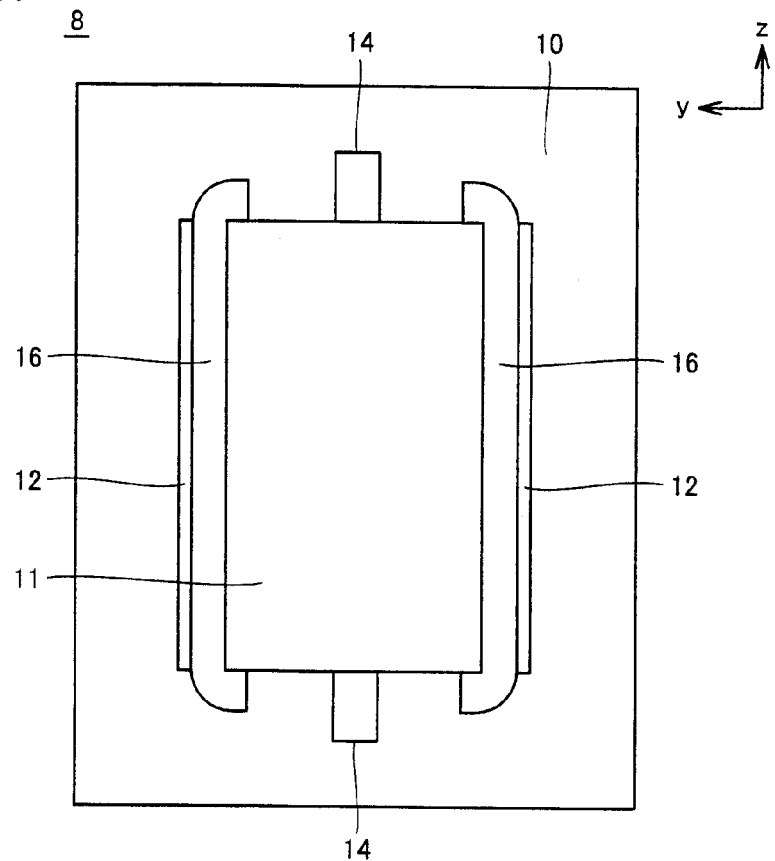
FIG. 4 is a front view of the insulating member shown in FIG. 2.

FIG. 4 is a front view of insulating member 8 shown in FIG. 2. Referring to FIG. 4, column part 14 is formed in the shape of a column, approximately at the midpoint between a pair of side surface parts 12, to have a gap from side surface part 12. Therefore, even when a pair of side surface parts 12 are flexed in the direction opposing each other at the time of mounting edgewise coil 6, column part 14 does not inhibit deformation of side surface parts 12. Then, when edgewise coil 6 is mounted on insulating member 8, edgewise coil 6 is supported in the z-direction by column part 14, so that edgewise coil 6 is fixed.

Figure 5:
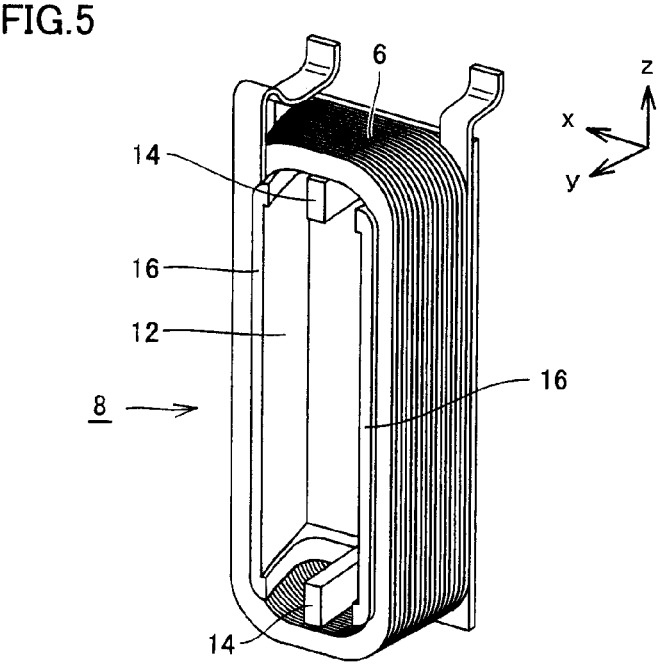
FIG. 5 is a perspective view showing that an edgewise coil is mounted on the insulating member.

FIG. 5 is a perspective view showing that edgewise coil 6 is mounted on insulating member 8. Referring to FIG. 5, edgewise coil 6 is mounted on insulating member 8 from the y-direction by flexing side surface parts 12 in the direction opposing each other. Edgewise coil 6 is then supported in the z-direction by column part 14, and edgewise coil 6 is supported in the stacking direction (y-direction) by flange part 16 mounted at the tip of side surface part 12.

Figure 6:
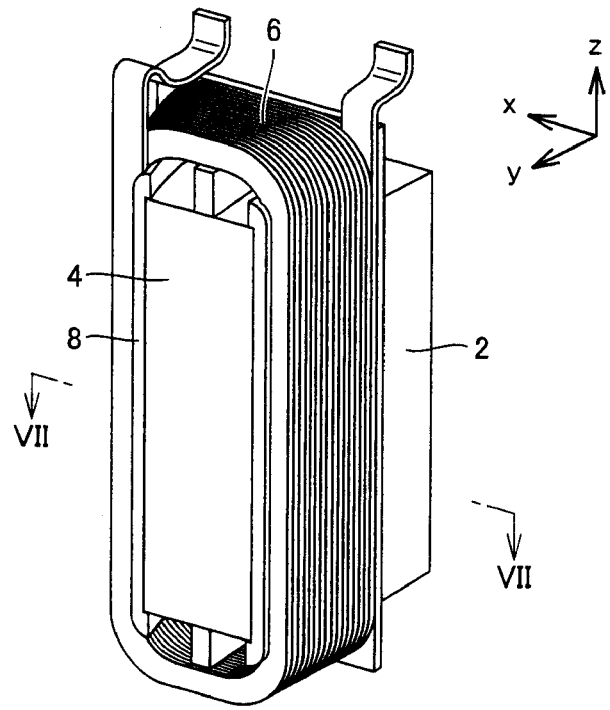
FIG. 6 is a perspective view showing that the edgewise coil mounted on the insulating member is mounted on a tooth.

FIG. 6 is a perspective view showing that edgewise coil 6 mounted on insulating member 8 is mounted on tooth 4. Referring to FIG. 6, after edgewise coil 6 is mounted on insulating member 8 (FIG. 5), edgewise coil 6 and insulating member 8 are integrally mounted on tooth 4.

Figure 7:
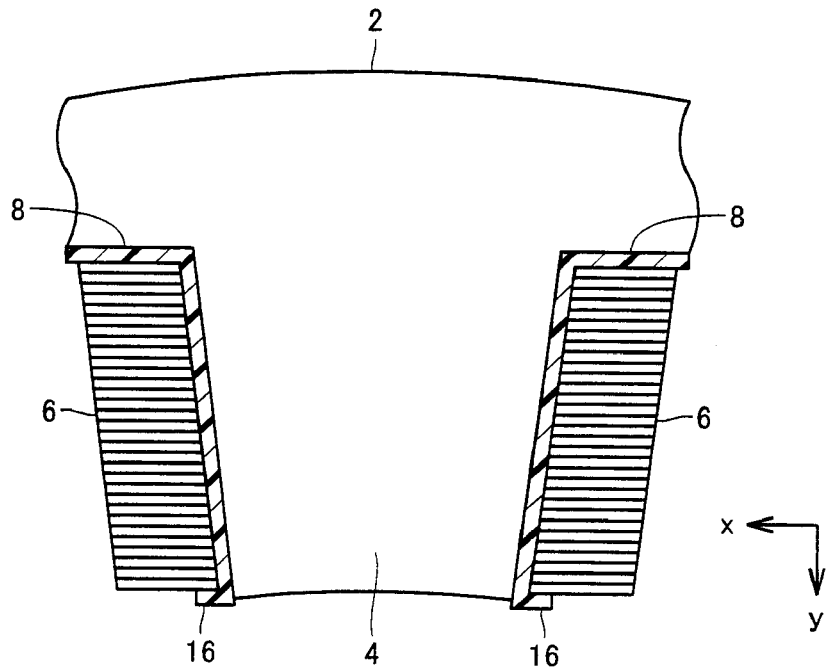
FIG. 7 is a cross-sectional view of section VII-VII shown in FIG. 6.

FIG. 7 is a cross-sectional view of section VII-VII shown in FIG. 6. Referring to FIG. 7, edgewise coil 6 is wound such that a flat plate conductor is stacked in the y-direction, and edgewise coil 6 is prevented from loosening by flange part 16 provided for insulating member 8. When the coil is formed of a round wire or a square wire, the flange width (the length in the x-direction) of flange part 16 has to be secured enough to prevent loosening of the coil. In this embodiment, however, the coil is formed of a flat plate conductor and therefore edgewise coil 6 can be supported merely by supporting only a part of edgewise coil 6 with flange part 16. In other words, the flange width (the length in the x-direction) of flange part 16 can be reduced.

As described above, in this embodiment, a pair of side surface parts 12 of insulating member 8 can be formed to be flexible in the direction opposing each other. A pair of column parts 14 of insulating member 8 are formed so as to permit deformation of side surface parts 12 and to be arranged between the inner circumferential surface of edgewise coil 6 and tooth 4. Therefore, after edgewise coil 6 is formed, edgewise coil 6 can be mounted on insulating member 8 by flexing a pair of side surface parts 12 in the direction opposing each other. Thus, in accordance with this embodiment, the assembly of edgewise coil 6 is significantly improved.

In addition, since column part 14 at least has a thickness corresponding to the distance that can insulate edgewise coil 6 from tooth 4, according to this embodiment, the insulation between edgewise coil 6 and tooth 4 can certainly be secured.

Moreover, since side surface part 12 has flange part 16 formed at the tip portion thereof to support edgewise coil 6 in the stacking direction, according to this embodiment, loosening of edgewise coil 6 can certainly be prevented.

Furthermore, since edgewise coil 6 is made of a flat plate conductor, edgewise coil 6 can be supported in the stacking direction even though the flange width of flange part 16 is smaller than the width of the flat plate conductor. Then, according to this embodiment, the material costs of insulating member 8 can be reduced by making the flange width of flange part 16 smaller than the width of the flat plate conductor of edgewise coil 6.

It is noted that although the cross-sectional shape of column part 14 is formed in the shape of a prism in the foregoing embodiment, it may be formed in the shape of a cylinder.

Although flange part 16 is formed along the long side of edgewise coil 6 in the foregoing embodiment, the flange may be formed only at a part of the long side of edgewise coil 6. This can further reduce the material costs of insulating member 8.

Furthermore, although insulating member 8 insulates the edgewise coil 6 wound around a tooth of a stator core from the stator core in the foregoing embodiment, the insulating member may insulate an edgewise coil from a rotor in a motor having an edgewise coil wound around a rotor.

The embodiment disclosed here should be understood in all respects as illustrative and not restrictive. The scope of the present invention is indicated by the claims rather than by the foregoing description of the embodiment, and all changes which come within meaning and range of equivalency of the claims are intended to be embraced therein.

The invention claimed is:

1. An insulating member for insulating an edgewise coil wound around a tooth of a core from said core, comprising:
    a rear surface part formed to be arranged between said edgewise coil and a yoke inner circumferential surface of said core;
    first and second side surface parts extending from said rear surface part to cover first and second side surfaces, respectively, of said tooth opposing slots adjacent to said tooth, said first and second side surface parts being formed to be flexible in a direction opposing each other; and
    first and second column parts extending from said rear surface part along third and fourth side surfaces of said tooth different from the first and second side surfaces of said tooth, while having a gap from said first and second side surface parts so as to permit deformation of said first and second side surface parts, said first and second column parts being formed to be arranged between an inner circumferential surface of said edgewise coil and said third and fourth side surfaces, respectively.

2. The insulating member according to claim 1, wherein each of said first and second column parts at least has a thickness corresponding to a distance that can insulate said edgewise coil from said tooth.

3. The insulating member according to claim 1, wherein each of said first and second side surface parts has a flange part formed at a tip portion thereof to support said edgewise coil in a stacking direction.

4. The insulating member according to claim 3, wherein a flange width of said flange part is smaller than a width of a flat plate conductor that forms said edgewise coil.

5. The insulating member according to claim 1, wherein said core is a stator core, and
    the insulating member insulates said edgewise coil wound around said tooth of said stator core from said stator core.

* * * * *